Patented May 6, 1930

1,757,498

UNITED STATES PATENT OFFICE

JAMES BADDILEY, PERCY CHORLEY, AND RAINALD BRIGHTMAN, OF BLACKLEY, MANCHESTER, ENGLAND, ASSIGNORS TO BRITISH DYESTUFFS CORPORATION LIMITED, OF MANCHESTER, ENGLAND, A COMPANY OF GREAT BRITAIN AND IRELAND

DYEING WITH AZO DYES

No Drawing. Application filed March 16, 1927, Serial No. 175,926, and in Great Britain September 7, 1926.

By this invention regenerated cellulose silks, such as viscose silk, are dyed in level shades with the dyestuffs obtained by coupling diazotized aromatic amines, their homologous derivatives and the sulphonic or carboxylic acids thereof, with 2-amino-8-naphthol-sulphonic acids including in this term their N substituted derivatives.

Some of these dyestuffs are already known, and have been described for dyeing wool, particularly for the production on wool of dyeings which are fast to milling, but it was not foreseen that these dyestuffs could be used for dyeing regenerated cellulose silks. It is well known that the animal fibres such as wool are quite different from the cellulose fibres both in chemical and in physical properties and it is therefore all the more surprising that these simple wool colours should have value for dyeing regenerated cellulose silks.

We do not limit ourselves to the use of the monoazo colours but we also include within the scope of our invention certain primary disazo dyes. The dyestuffs which we find to be applicable in our process of dyeing regenerated cellulose materials in even level shades, may be represented by the following generic formula

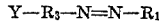

wherein $R_3$ represents the coupled residue of a 2-amino-8-naphthol sulphonic acid, $R_1$ represents a coupled residue derived from a diazo compound and Y represents hydrogen or a coupled residue having the structure

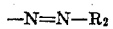

in which $R_2$ is derived from a second diazo compound. The 2-amino-8-naphthol sulphonic acids which we find advantageous as starting materials in preparing these dyestuffs are sulphonated 2-amino-8-naphthols having the characteristic structure

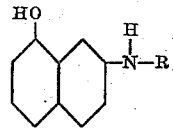

wherein R represents hydrogen, an alkyl group or a phenyl or naphthyl residue. The monoazo dyestuffs may be represented by the following structurel formula.

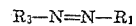

wherein $R_3$ represents the coupled residue of a sulphonated 2-amino-8-naphthol and $R_1$ represents a residue derived from a diazo compound. The primary disazo dyestuffs may be represented by the generic structural formula

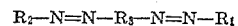

wherein $R_3$ represents the coupled residue of a sulphonated 2-amino-8-naphthol, $R_1$ represents a residue derived from a diazo compound and $R_2$ represents a residue derived from a second diazo compound. The monoazo dyestuffs are obtained in the known manner by coupling in alkaline or in acid solution. We have found that useful disazo colours can be obtained by coupling one molecule of a diazo compound on to a sulphonic acid of 2-amino-8-naphthol, or its N substituted derivatives, in an acid medium and afterwards combining the monoazo colour in an alkaline medium with one molecule of the same or a different diazo compound. For example the diazo compound obtained from 218 parts of para-nitroaniline-ortho-sulphonic acid with 69 parts of sodium nitrite in the known way is coupled with 315 parts of 2-phenylamino-8-naphthol-6-sulphonic acid in an acid medium. The mixture so obtained is made alkaline with sodium carbonate and to this is added a solution of the diazo compound obtained in the known way from 143 parts of α-naphthylamine. The coupling mixture is maintained alkaline until coupling is complete after which the dyestuff is isolated by addition of salt. The structure is believed to be

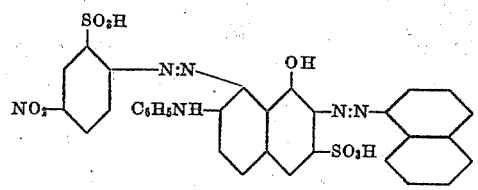

It forms a black powder which dyes viscose silk a blue violet shade. If 8-hydroxy-2-2'-dinaphthylamine-6-sulphonic acid be used in place of 2-phenylamino-8-naphthol-6-sulphonic acid in the above example the dyestuffs obtained dyes viscose silk a blue shade.

8 - hydroxy-2:2'- dinaphthylamine - 6-sulphonic acid is prepared by heating 2-amino-8-naphthol-6-sulphonic acid with sodium bisulphite and β-naphthylamine. When the reaction is completed, the mixture is diluted and the product precipitated by the addition of common salt, filtered off, dissolved in soda and filtered from unchanged β-naphthylamine and any ββ-dinaphthylamine which may be present. The 8-hydroxy-2:2'-dinaphthylamine-6-sulphonic acid is then precipitated as a white or greyish substance by acidifying the filtrate. Its probable structure is:

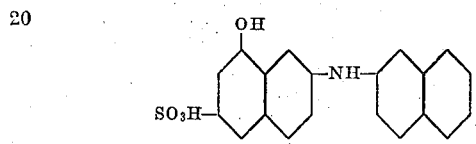

8 - hydroxy-2:2'-dinaphthylamine-3:6-disulphonic acid is similarly obtained from 2-amino-8-naphthol-3:6-sulphonic acid, sodium bisulphite and β-naphthylamine.

For the preparation of 8-hydroxy-2:1'-dinaphthylamine-6-sulphonic acid, 2-amino-8-naphthol-6-sulphonic acid is heated with sodium bisulphite and α-naphthylamine. After salting out the product as above described, the solid is washed with hydrochloric acid to remove unchanged α-naphthylamine, and is then ready for use, no αα-dinaphthylamine being formed. Its structure is probably

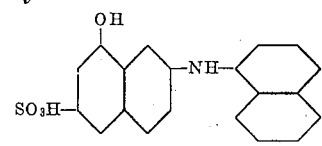

The regenerated cellulose silk fabric is dyed in the usual manner. The following description is typical of the manner in which the dyeing may be carried out, but we do not limit ourselves to the conditions here given:— The dyebath is made up from 3000 parts of water, 3 parts of soap, 10 parts of Glauber's salt and 1 part of the dyestuff obtained by combining the diazo compound from dehydrothio-p-toluidine sulphonic acid with 1 molecule of 2-phenylamino-8-naphthol-6-sulphonic acid in alkaline solution. This dyestuff has the probable structure:

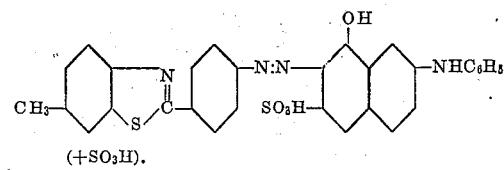

(+SO₃H).

100 parts of the regenerated cellulose silk goods are entered into the bath warm, after which the bath is heated nearly to the boil and dyeing is allowed to proceed nearly at the boil for about 1 hour. The goods are then removed, rinsed and dried. The resulting dyeing is a level deep brown shade, fast to washing, alkalis and to light.

The range of shades obtainable with monoazo dyes alone is further illustrated by the examples in the following table.

| Arylamine diazotized | Aminonaphthol coupled | Coupling medium | Shade on viscose silk |
|---|---|---|---|
| p-anisidine | 2-amino-8-naphthol-6-sulphonic acid | Alkaline | Reddish-brown |
| o-anisidine | 2-amino-8-naphthol-6-sulphonic acid | Alkaline | Red |
| 2:5-dichloroaniline | 2-phenylamino-8-naphthol-6-sulphonic acid | Alkaline | Brown |
| 5-nitro-o-anisidine | 2-phenylamino-8-naphthol-6-sulphonic acid | Acid | Deep blue |
| Naphthionic acid | 2-phenylamino-8-naphthol-6-sulphonic acid | Acid | Violet brown |
| 2-chloro-p-toluidine-5-sulphonic acid | 2-phenylamino-8-naphthol-6-sulphonic acid | Alkaline | Brown |
| Aniline | 8-hydroxy-2:1'-dinaphthylamine-6-sulphonic acid | Alkaline | Brown |
| m-aminobenzoic acid | 8-hydroxy-2:2'-dinaphthylamine-6-sulphonic acid | Alkaline | Brown |
| 2:5-dichloroaniline | 8-hydroxy-2:2'-dinaphthylamine-3:6-disulphonic acid | Acid | Red |
| 4-chloro-o-anisidine | 8-hydroxy-2:2'-dinaphthylamine 3:6-disulphonic acid | Alkaline | Bordeaux |
| Dehydrothio-p-toluidinesulphonic acid | 2-O-anisoylamino-8-naphthol-6-sulphonic acid | Alkaline | Brown |
| Dehydrothio-p-toluidinesulphonic acid | 2-phenylamino-8-naphthol-6-sulphonic acid | Alkaline | Brown |
| p-chloroaniline | 2-p-chlorophenylamino-8-naphthol-6-sulphonic acid | Alkaline | Light brown |
| Dehydrothiotoluidinesulphonic acid | 2 (2':4' - dinitrophenylamino) -8- naphthol -6- sulphonic acid | Alkaline | Reddish brown |
| Dehydrothiotoluidinesulphonic acid | 8-hydroxy-2:2'-dinaphthyl-amino-6-sulphonic acid | Alkaline | Brown |
| 4:4'-nitroaminodiphenylsulphide | 8-hydroxy-2:2'-dinaphthyl-amine-3:6-disulphonic acid | Alkaline | Brown |
| p-aminoacetaniline | 2-ethylamino-8-nahpthol-6-sulphonic acid | Alkaline | Reddish brown |
| Dianisidineoxamic acid | 2-phenylamino-8-naphthol-6-sulphonic acid | Alkaline | Reddish blue |

What we claim and desire to secure by Letters Patent is:—

1. The process of dyeing regenerated cellulose materials in level shades comprising the application of dyes having the probable formula $Y-R_3-N=N-R_1$ wherein $R_3$ represents the coupled residue of a sulphonated 2-amino-8-naphthol, $R_1$ represents a residue from a diazo compound and Y represents hydrogen or the structure $-N=N-R_2$ in which $R_2$ is the residue from a second diazo compound.

2. The process of dyeing regenerated cellulose materials in level shades comprising the application of dyes having the following probable structural formula

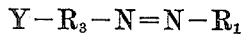

wherein $R_3$ represents the coupled residue of a sulphonated 2-amino-8-naphthol having the characteristic structure

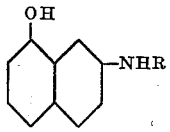

wherein R represents hydrogen, an alkyl group or a phenyl or naphthyl residue, $R_1$ represents a residue from a diazo compound and Y represents hydrogen or the structure

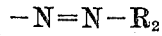

in which $R_2$ is a residue from a second diazo compound.

3. The process of dyeing regenerated cellulose materials in level shades comprising the application of dyes having the following probable structural formula

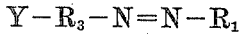

wherein $R_3$ represents the coupled residue of a 2-amino-8-naphthol-6-sulphonic acid, $R_1$ represents a residue from a diazo compound and Y represents hydrogen or the structural formula

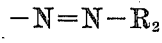

in which $R_2$ is a residue from a second diazo compound.

4. The process of dyeing regenerated cellulose materials in level shades comprising the application of monoazo dyes obtained by coupling a sulphonated 2-amino-8-naphthol with a diazo compound.

5. The process of dyeing regenerated cellulose materials in level shades comprising the application of monoazo dyes obtained by coupling a 2-amino-8-naphthol-6-sulphonic acid with a diazo compound.

6. The process of dyeing regenerated cellulose materials in level shades comprising the application of monoazo dyes obtained by coupling a 2-amino-8-naphthol-6-sulphonic acid having the characteristic structure

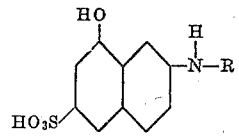

wherein R represents hydrogen, an alkyl group or a phenyl or naphthyl residue, with a diazo compound.

In testimony whereof we affix our signatures.

JAMES BADDILEY.
PERCY CHORLEY.
RAINALD BRIGHTMAN.